Jan. 20, 1959 W. A. TIKANEN 2,870,301
PRESSURE RESPONSIVE RESISTOR
Filed Aug. 26, 1953 2 Sheets-Sheet 1
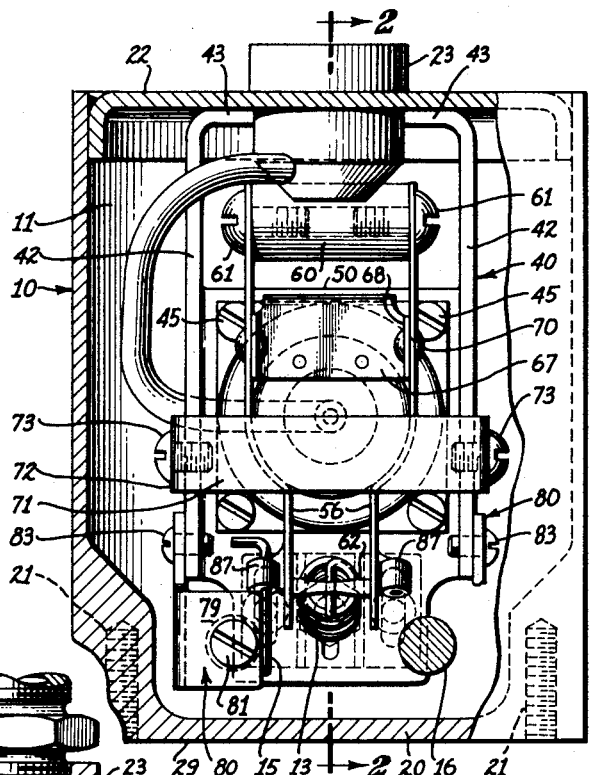
WILLIAM A. TIKANEN,
INVENTOR.
BY *George L. Smyth*
ATTORNEY.

Jan. 20, 1959  W. A. TIKANEN  2,870,301
PRESSURE RESPONSIVE RESISTOR
Filed Aug. 26, 1953  2 Sheets-Sheet 2

WILLIAM A. TIKANEN,
INVENTOR.

BY

ATTORNEY.

United States Patent Office 2,870,301
Patented Jan. 20, 1959

2,870,301

PRESSURE RESPONSIVE RESISTOR

William A. Tikanen, Reseda, Calif., assignor to Genisco, Inc., Los Angeles, Calif., a corporation Application August 26, 1953, Serial No. 376,636

10 Claims. (Cl. 201—48)

This invention relates to devices for measuring fluid pressure, referring especially to devices incorporating fluid responsive bellows, and is directed to the problem of rendering such a device non-responsive to acceleration forces.

In a fluid pressure measuring device of this type, some kind of detecting means is operatively associated with the bellows to respond to the pressure changes. If such a device, constructed and arranged in a conventional manner, is installed where it will be subject to substantial acceleration forces, both the inertia of the bellows and the inertia of the detecting means associated with the bellows will introduce error into the pressure indications reported by the device. The errors tend to be of high magnitude in aircraft and guided missiles where high accelerations are normal. If a fluid pressure measuring device of this type is used as a sensing component of a servo system for automatic control of an aircraft or of a guided missile, it is, of course, of primary importance to avoid such erroneous actions.

The present invention takes into account the fact that acceleration effects may be introduced either by the mass of the bellows of the fluid pressure measuring device or by the mass of the associated detecting means. Special provisions are made for neutralizing both masses.

The inertia of the material of a cylindrical corrugated bellows will cause the bellows to respond to acceleration and deceleration by lateral displacement, or by longitudinal extension and contraction, or by both movements, in accord with the direction of the force of acceleration or deceleration. The invention minimizes both acceleration movements by fixedly anchoring one end of the bellows and by stiffening one longitudinal side of the bellows to reduce lateral sway or flexure. A feature of the invention in this respect is the concept of not only stiffening one longitudinal side of the bellows against lateral displacement, but also of immobilizing the stiffened side against longitudinal expansion and contraction. With the opposite side of the bellows free to expand and contract in response to fluid pressure acting on the bellows, the bellows functions with arcuate movement, the circumferential corrugations being in effect pivotally connected along the stiffened side of the bellows. It has been found that restricting the expansion and contraction action of the bellows along one side in this manner not only reduces to a minimum lateral displacement or side sway on the part of the bellows, but also minimizes longitudinal reaction of the bellows to accelerations in or near the direction of the bellows axis. In the preferred practice of the invention, the further step of spring-loading the bellows further minimizes the acceleration responsiveness of the bellows.

A feature of preferred practices of the invention is the use of a plate attached to the side of the cylindrical bellows tangentially thereof to stiffen one longitudinal side of the bellows and to restrict longitudinal expansion and contraction of the bellows on that side. The arcuate movement of expansion and contraction of the cylindrical bellows occurs in a central diametrical plane perpendicular to the tangential plate and the tangential plate is sufficiently flexible to bow slightly in this central plane in response to expansion of the bellows. The plate is relatively wide, however, and preferably is anchored rigidly at the anchored end of the bellows so that the plate confines movement of the bellows to the central plane and makes the bellows non-responsive to components of force outside the central plane.

Immunization of the associated detecting means against acceleration effects is accomplished by confining the responsive movement of the detecting means to one plane or planes parallel to one plane and by balancing the detecting means with respect to acceleration forces in that plane. In the preferred practice of the invention the detecting means is operatively connected to the outer end of the bellows to oscillate or move arcuately with the end of the bellows in the same central diametrical plane as the bellows. The arcuate path of the detecting means at least approximates a true arc having an axis of curvature substantially perpendicular to the diametrical plane.

Acceleration response on the part of the detecting means are minimized by balancing the mass of the detecting means with respect to anticipated acceleration forces in the aforementioned central diametrical plane. Preferably the center of gravity of the detecting means together with any structure movable therewith is at least approximately located at the axis of curvature of its arcuate path of movement for equilibrium of the detecting means under acceleration force exerted in any direction in the central diametrical plane. Thus, with movement of the detecting means and the expansion and contraction of the bellows confined to the central diametric plane or planes parallel thereto, and with the detecting means balanced with respect to all directions of force about an axis perpendicular to that plane, it is apparent that fluid pressure measuring operation of the device will be uninfluenced by acceleration forces in all possible directions.

For the purpose of disclosure, the invention will be described herein as embodied in a fluid pressure transducer which converts fluid pressure values into electrical values, but it will be understood that the invention is not limited to this particular purpose. Preferably, the detecting means includes a pivoted member and a potentiometer cooperaitve therewith. The pivoted member is operated by the bellows and carries the brush or wiper of the potentiometer. With the bellows and the indicating means, including the potentiometer brush, immune from acceleration forces, such an arrangement may be used in a servo system for reliable and accurate automatic control in the operation of aircraft and guided missiles.

The various features, advantages and possible applications of the invention may be readily understood from the following detailed descripiton of the selected embodiment of the invention as a fluid pressure transducer, the description being considered with the accompanying drawings.

In the drawings, which are to be regarded as merely illustrative:

Figure 1 is a side elevation of the selected embodiment of the invention with parts broken away to reveal concealed structure;

Figure 2 is a sectional view taken in general as indicated by the line 2—2 of Fig. 1;

Figure 3 is a top view of the device on a reduced scale;

Figure 4:
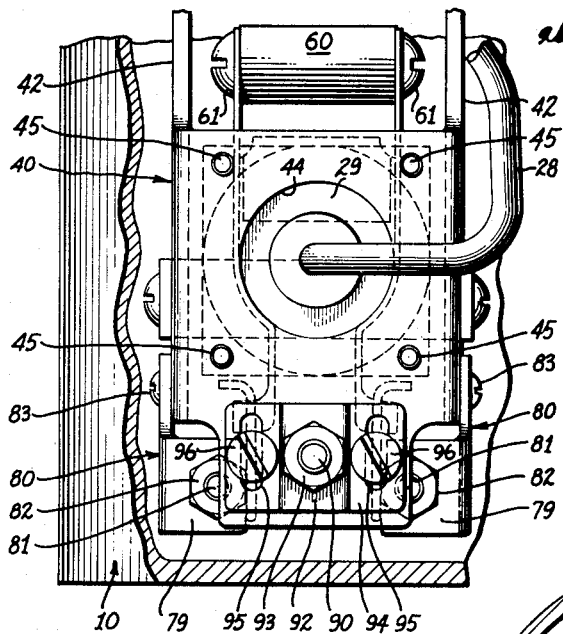
Figure 4 is an enlarged section taken as indicated by the line 4—4 of Figure 2.

The principal parts of the form of the invention shown in the drawings include; a cylindrical housing, generally designated by numeral 10, which forms what may be termed an outer chamber 11; a bellows 12 inside the housing; a spring 13 tending to contract the bellows; and detecting means actuated by the bellows, which detecting means includes at least one brush or wiper 15 movable along a corresponding potentiometer 16. In the present embodiment of the invention there are two parallel potentiometers 16 and two corresponding wipers 15 actuated by the bellows.

If the device is to be employed to measure a differential fluid pressure, the housing 10 will be placed in communication with one of the two fluids involved and the interior of the bellows 12 will be placed in communication with the other of the two fluids. If the "gauge" pressure of a fluid is to be measured, the outer chamber 11 in the housing 10 will be placed in communication with the atmosphere and the interior of the bellows 12 will be placed in communication with the fluid under pressure. If the absolute pressure of a fluid is to be measured, the housing 10 will be evacuated to a high vacuum and the interior of the bellows 12 will be placed in communication with the fluid. For the purpose of the present disclosure, it will be assumed that the device is to be employed for measuring absolute pressure and therefore the housing 10 will be evacuated.

The housing 10 may be in the form of a cylindrical shell closed at one end by a bottom wall 20 and provided with threaded bores 21 to receive suitable screws for mounting the housing in upright position. The top of the housing may be closed in a sealed manner by a flanged wall member 22 in which is mounted an internally threaded body 23 and a suitable terminal header 24. The threaded body 23 is adapted to place the interior of the bellows 12 in communication with the fluid to which the device is to respond and for this purpose is adapted for engagement by a tubing connector 27 and is connected to a tube 28 inside the housing. The tube 28 is connected at its second end to the interior of the bellows 12 through a wall member 29 at the fixed end of the bellows.

The terminal header 24, in which is mounted a plurality of terminal members 30 for the electrical circuits involved, comprises a circular body of nonconducting material embraced by a ring 31. The purpose of the header 24 is to mount the terminal members 30 in the wall of the housing in a fluid-tight manner, the terminal members being connected by wires (not shown) to the two brushes 15 and the two potentiometers 16.

Figure 7:
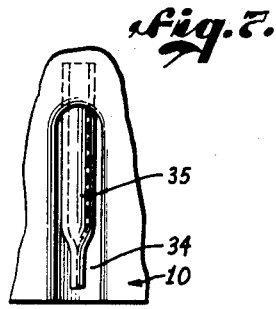
Figure 7 is an enlarged detail viewed as indicated by the line 7—7 of Figure 3.

As shown in Figures 3 and 7, the cylindrical wall of the housing 10 may be offset to form a short longitudinal groove 34 on its exterior. A piece of tubing 35 is mounted in the groove 34 and at the end of the groove extends into the interior of the housing. Thus the tubing 35 lies entirely within the circumference of the housing. If the chamber 11 inside the housing 10 is to be placed in communication with a confined fluid body outside of the housing, the tubing 35 will be employed for communication with the fluid body; and if the device is to be used with the interior of the housing in communication with the atmosphere the tubing 35 will be open for this purpose. In the present embodiment of the invention, however, the purpose of the tubing 35 is to provide a convenient connection for evacuating air from the housing 10 to create a vacuum therein. When the housing has been evacuated, the piece of tubing 35 is pinched as shown and heat is applied to form a seal, the interior of the tubing being tinned or coated with solder for heat sealing.

Figure 5:
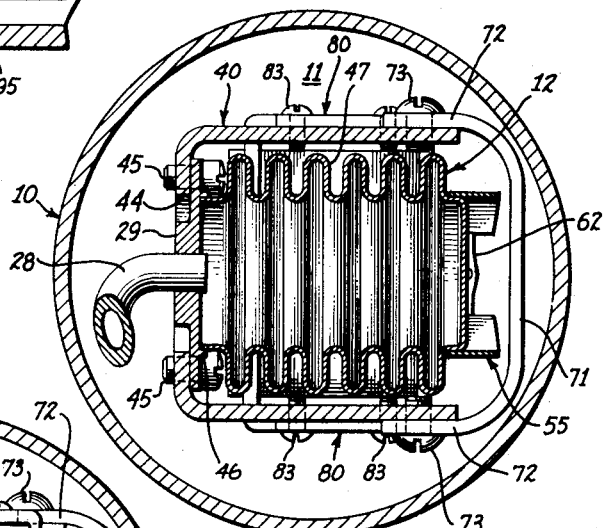
Figure 5 is a section taken as indicated by the line 5—5 of Figure 2.

The housing 10 may be employed as a base or fixed anchorage for the bellows 12, but preferably a special base member, designated as a whole by numeral 40, is fixedly mounted inside the housing to support the bellows. The particular base member 40 shown in the drawings is in the form of a U-shaped plate providing a base wall 41 and two side walls 42, the two side walls being formed with end flanges 43 by means of which the base member is welded or otherwise bonded to the end wall 22 of the housing 10. The base wall 41 of the base member is formed with a circular aperture 44 which is spanned by the previously mentioned end wall member 29 of the bellows, the wall member being fixedly mounted on the base wall by suitable screws 45. As best shown in Figure 5, the wall member 29 is formed with a circular flange 46 and the corrugated shell of the cylindrical bellows 12 is embraced by this flange with the shell bonded to the flange in a fluid-tight manner. The bellows 12 is formed with the usual circumferential folds or corrugations 47 for longitudinal expansion and contraction in response to changes in the pressure differential between the interior and exterior of the bellows.

In accord with one of the concepts underlying the invention, the bellows 12 is restricted against longitudinal expansion and contraction along one longitudinal side. For this purpose at least some of the corrugations 47 are suitably interconnected to prevent relative longitudinal movement therebetween at the points of interconnection. Preferably a stiffening means is employed for the dual purpose of restricting longitudinal action on the selected side of the bellows and of preventing the bellows from being displaced or swayed laterally by laterally directed acceleration forces.

In the present embodiment of the invention, what may be termed a restricting plate or strap 50 is attached to one side of the bellows 12 for this purpose. The strap 50 is, in this instance, a substantially flat member attached tangentially to the side of the bellows and extending longitudinally of the bellows, the strap being connected tangentially to at least some of the corrugations 47 and preferably being connected to all of the corrugations. As shown in Figure 2 one end of the tangential strap 50 may be formed with a flange 51 that is bonded to the previously mentioned end wall member 29 of the bellows. Thus the strap is fixedly connected with the anchored end of the bellows and with the base member 40 on which the bellows is mounted.

As shown in Figure 1, the tangential strap 50 is preferably relatively wide to provide a high degree of resistance to lateral displacement or flexure of the bellows in the tangential plane of the strap and it is further contemplated that the tangential strap will materially oppose displacement or flexure of the bellows in the central diametrical plane of the bellows that is perpendicular to the tangential strap. Thus the strap substantially immobilizes the bellows against displacement or flexure in the tangential plane and minimizes flexure in the central diametrical plane of the bellows.

With one longitudinal side of the bellows 12 restrained against longitudinal movement by the restricting strap 50 and with the opposite longitudinal side of the bellows free to move longitudinally, the corrugations of the bellows will fan apart arcuately with rising fluid pressure in the bellows and the bellows will cause the restricting strap 50 to bow slightly at the same time.

Various arrangements for shifting the potentiometer wipers 15 or equivalent means in response to the fan-like action of the bellows 12 may be employed in various practices of the invention. In this instance, a responsive member in the form of an angular brush carrier, designated as a whole by the numeral 55, is suitably mounted on the assembly carried by the base member 40 to respond to extension and contraction of the bellows by arcuate movement in the previously mentioned central diametric plane of the bellows. Preferably the responsive member or brush carrier 55 is pivotally supported at relatively widely spaced points on a pivot axis to confine its movement to this central plane so that with respect to acceleration forces the problem of balancing the brush carrier for equilibrium is reduced to factors effective in this plane.

In the present construction, the brush carrier 55 comprises two angular strap members 56 forming two diverging legs 57 and 58. The leg 57 lies against the end of the bellows for actuation thereby and overhangs the side of the bellows that is free to expand and contract with pressure changes. The other leg 58 of the brush carrier extends longitudinally adjacent the restricting strap 55. The two strap members 56 of the brush carrier are interconnected by a cylindrical counterweight 60 at one end, being attached thereto by suitable screws 61, and are interconnected at the other end by a strut 62.

Figure 6:
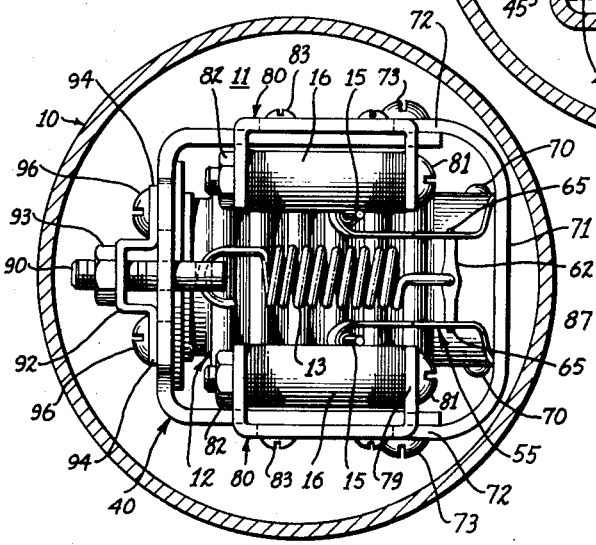
Figure 6 is a section taken as indicated by the line 6—6 of Figure 2.

As shown in Figure 6, the strut 62 is formed with reduced ends 65 by means of which the strut is mounted in corresponding bores 66 in the two straps. There is a plurality of pairs of the bores 66 to permit the strut to be shifted relative to the brush carrier for purpose of adjustment, as will be explained hereinafter.

The responsive member or brush carrier 55 is, in this instance, pivotally mounted on the restricting strap 50 in abutment with the end of the bellows. For this purpose, the restricting strap 50 is formed with an end portion 67 overhanging the end of the bellows and bonded thereto, this end portion being flanged to form two parallel ears 68. Suitable rivets 70, extending through the ears 68 and the corresponding strap members 56, pivotally mount the brush carrier 55 for the desired arcuate movement in response to pressure changes.

Since the spring 13 continually urges the brush carrier 55 against the end of the bellows, it is not necessary to directly connect the brush carrier to the end of the bellows. It is to be understood, however, that the spring 13 may be omitted and the brush carrier bonded directly to the bellows.

Preferably suitable stop means is provided to prevent damaging extension of the bellows 12 in response to excessive pressure. For this purpose, a suitable bar 71 extends adjacent the free end of the bellows 12 to block excessive movement by the brush carrier 55. The two ends of the bar 71 are bent to form a pair of legs 72 as best shown in Figure 5 and these legs are attached by suitable screws 73 to the side walls 72 of the base member 40.

The two potentiometers 16 may be of a conventional construction in which a fine wire resistor is wound helically on a suitable cylindrical core. In the construction shown, each of the potentiometers 16 is mounted between the two ears 79 of a bracket 80 by means of an axial screw 81 and a nut 82. Each of the brackets 80 is mounted on a side wall 42 of the base member 40 by a pair of screws 83.

The two brushes 15 of the respective potentiometers 16 may be mounted on the responsive member or brush carrier 55 in any suitable manner. In the illustrated construction each of the two strap members 56 of the brush carrier 55 has an extension 87 which is looped around a non-conducting bushing 88 and the two brushes 15 are pin-like metal conductors mounted respectively in these two brushings. As may be seen in Figure 6, the two brushes 15 ride against the inner sides of the two potentiometers 16 and thereby cooperate with the two potentiometers to stabilize the brush carrier 55 and to prevent lateral movement of the brush carrier relative to the previously mentioned central diametrical plane.

The coil spring 13 that urges the brush carrier against the end of the bellows may be hooked at one end through a central aperture in the strut 62, as shown in Figures 2 and 6, and at the other end may be suitably attached or anchored to the base member 40. A feature of the present embodiment of the invention is that this second anchored end of the spring is adjustable with respect to its attachment to the base member 40. For this purpose, the second end of the spring 13 is hooked through an eye in the end of adjustment screw 90 that extends through a longitudinal adjustment slot 91 in the base wall 41. The adjustment screw 90 extends in a longitudinally slidable manner through the wall of a U-shaped bracket 92 and is retained by a nut 93, the nut being pulled against the bracket by the tension of the spring 13. As best shown in Figure 4, the U-shaped bracket 92 is formed with two side flanges 94 having a longitudinal slots 95. The U-shaped bracket 92 is mounted on the base wall 41 by a pair of screws 96 that extend through the two slots 95 respectively.

In response to expansion and contraction of the bellows 12, each of the two brushes 15 moves in an arcuate path that is the resultant of the pivotal action of the end of the bellows combined with the bowing of the bellows and restricting strap. Without the bowing action the approximate axis of curvature of the paths of the two brushes would lie near the outer end of the restricting strap 50. With the bowing action, the approximate axis of curvature of the arcuate paths of the two brushes is near the midpoint of the restricting strap.

As viewed in Figure 2, the counterweight 60 lies at a distance above this axis of curvature to balance the structure of the detecting means that lies below the axis of curvature. As a result, the structure of the detecting means including the brush carrier and the two brushes will be in equilibrium with respect to horizontal acceleration forces in the plane of Figure 2, which is the aforementioned central diametric plane of the bellows. It is further contemplated that the counter-weight 60, as viewed in Figure 2, will lie to the left of the axis of curvature a sufficient distance to counter-balance the structure of the detecting means to the right of the axis of curvature so that the detecting means will be in equilibrium with respect to vertical acceleration forces in the central diametrical plane. Thus the center of gravity of the detecting means is substantially or approximately at the axis of curvature of the arcuate paths of the two brushes 15, so that the detecting means will be in equilibrium with respect to all possible components of acceleration force in the central diametrical plane.

It is to be understood that the paths of the two brushes 15 need not and usually will not be true arcs, the apparent axis of curvature of the arcuate paths shifting somewhat in the course of the arcuate movement. It is sufficient for the purpose of the invention that the movement of the two brushes approximate movement about an axis and that the center of gravity of the structure of the detecting means be sufficiently close to the apparent axis of arcuate movement to reduce all acceleration responses of the two brushes to insignificant magnitude.

If the strap 50 were so stiff as to flex to no appreciable extent whatsoever in response to pressure changes in the bellows, the indicating movement of the two brushes would be concentric to the axis of the rivets 70 on which the brush carrier 55 is pivotally mounted. The strap may flex to an appreciable degree, however, in response to pressure changes so that the movement of the brushes is a resultant of two components of motion. One component of motion is provided by arcuate movement of the brush holder 55 about the axis of the rivets 70, this being the major component, and the other component is provided by the yielding action of the strap 50 which action carries the rivets laterally. The electrical values controlled by the potentiometers are not affected to any significant degree by such lateral shift of the two rivets 70 in response to flexing of the strap 50 because such shifting displaces the two brushes 15 laterally with respect to the two potentiometers 16. The electrical values are changed only by movement of the two brushes longitudinally of the two potentiometers.

The device may be adapted to respond in an optimum manner through different pressure ranges by using different springs 13 for the different ranges. Minor adjustments in the force exerted by any selected spring may be made by adjusting the points of connection at the opposite ends of the spring. Thus the strut 62 may be shifted upward as viewed in Figure 2 from one set of bores 66 to another set, and the adjustment screw 90 may at the same time be shifted downward as viewed in Figure 2, thereby lengthening the distance between the points of connection of the spring with corresponding increase in the length and tensioning of the spring. To shift the strut 62 from one pair of bores 66 to another, it is necessary merely to spring the two strap members 56 slightly apart temporarily. To shift the adjustment screw 90 in the adjustment slot 91, it is merely necessary to loosen the two screws 96 temporarily to permit the U-shaped bracket 92 to be shifted. In addition to these two adjustments the nut 93 may be rotated to lengthen or shorten the spring 13.

While the spring 13 may be omitted in view of the resiliency of the bellows, the spring is especially advantageous where linear responsiveness is desired. By using a spring that dominates the resiliency of the bellows linear responsiveness may be achieved with a relatively inexpensive bellows which in itself is non-linear.

My description in specific detail of the selected embodiment of the invention will suggest to those skilled in the art various changes, substitutions, and other departures from my disclosure that properly lie within the spirit and scope of the appended claims.

I claim:

1. A device to measure fluid pressure comprising: a base; an assembly including a corrugated bellows mounted at one end on said base and free at the other end; restricting means included in said assembly and attached to said base, said restricting means being connected to said bellows along a first particular side of the bellows to restrict the longitudinal expansion and contraction of the bellows along that particular side, the opposite side of the bellows being free to expand and contract whereby the free end of the bellows moves arcuately about a particular axis at the restricted side of the bellows in response to pressure changes; detecting means including a responsive member entirely supported by the said assembly and rigidly disposed against the free end of the bellows and coupled to said restricting means for arcuate movement relative to said assembly with the free end of the bellows about the particular axis; a coil spring included in said assembly, said coil spring being fixedly anchored relative to the base at one end and operatively coupled at its other end to the responsive member to exert force against the responsive member in a direction for pressing the responsive member against the free end of the bellows and for opposing the expansion of the bellows to obtain an accurate sensing of the movement of the bellows; and counterbalance means operatively coupled to said responsive member at the end of the responsive member opposite to said spring and cooperative with said spring in exerting forces on said responsive member for maintaining dynamic equilibrium of said responsive member with respect to acceleration moments about said particular axis in the plane of arcuate movement.

2. A device as set forth in claim 1 in which the operative coupling between the spring and the responsive member is adjustable to vary the length and stressing of the spring.

3. A device as set forth in claim 1 in which the point of anchorage of said spring is variable to vary the length and stressing of the spring.

4. A device as set forth in claim 1 in which said restricting means is relatively stiff in a direction parallel to said axis of curvature to resist flexure of said bellows in directions parallel with said axis.

5. A device to measure fluid pressure comprising: a base; an assembly mounted on said base and including a bellows having one end fixed to the base and having the other end free; a restricting member attached at one side to the base and extending from said base along a particular side of said bellows and attached to the peripheries of the corrugations of the bellows along the particular side of the bellows to restrict the expansion and contraction of the bellows along the particular side, the opposite side of the bellows being free for longitudinal expansion and contraction in response to changes in fluid pressure; responsive means supported by said restricting member and mounted on the restricting member at a position contiguous to the free end of the bellows for rigid disposition against the free end of the bellows and disposed in overhanging relationship to the opposite side of the bellows to move arcuately with respect to said restricting member in response to expansion and contraction of the opposite side of the bellows about an axis of curvature substantially perpendicular to said restricting member; a resistor disposed in fixed relationship to the base on said opposite side of the bellows and on a first particular side of the axis of curvature and extending in a direction corresponding substantially to the direction between the fixed and free ends of the bellows, and a brush disposed in cooperative relationship with said resistor on the same side of the axis of curvature as said resistor to vary the current therein, said brush being carried by said responsive means at the overhanging position of the responsive means to move arcuately with the responsive means, and a counterweight carried by said responsive means on the opposite side of said axis of curvature from said brush for dynamic equilibrium of the responsive means in the different positions of the responsive means with respect to forces exerted on the responsive means.

6. A device as set forth in claim 5 in which said restricting member is relatively stiff in the plane of said axis of curvature and is slightly flexible in said diametrical plane to bow in response to expansion and contraction of the bellows.

7. A device as set forth in claim 5 which includes spring means connected between said base and said responsive means at the overhanging position of said responsive means to exert a force against said responsive means in a direction for opposing the expansion of said bellows in response to increases in fluid pressure in the bellows.

8. In combination, a bellows fixedly positioned at one end and movable at the other end and having an opening at the fixed end to receive fluid for the measurement of the fluid pressure in accordance with the expansion or contraction of the bellows at the movable end, means for providing for the introduction of fluid into the opening at the fixed end of the bellows, means extending along one side of the bellows to restrict the expansion or contraction of the bellows at that side, a pivot pin mounted on the restricting means at the movable end of the bellows, a member mounted on the pin for pivotal movement relative to the restricting member and disposed against the movable end of the bellows for pivotal movement in accordance with the expansion or contraction of the bellows, a spring fixedly anchored at one end and connected to the pivotal member at the other end to exert a force on the pivotal member for returning the member toward a zero position upon a reduction of the fluid pressure in the bellows, sensing means carried by the pivotal member for detecting the pivotal movements of the member, and a counterbalance carried by the pivotal member at the end of the pivotal member opposite to the spring for acting with the spring in dynamically balancing the pivotal member in any position of the pivotal member.

9. The combination as set forth in claim 8 in which the pivotal member has a first portion extending beyond each side of the bellows in a direction transverse to the direction of bellows expansion or contraction and has a pair of second portions extending from the opposite ends of the first portion in the direction of bellows expansion or contraction toward the fixed end of the bellows and in which the spring and the sensing means are connected to one of the second portions on the pivotal member and in which the counterbalance is carried by the other one of the second portions on the pivotal member.

10. In combination, a bellows fixedly disposed at one end and movable at the other end and having an opening at the fixed end for receiving fluid for the measurement of the fluid pressure in accordance with the expansion or contraction of the bellows at the movable end, means for providing for the introduction of fluid into the opening at the fixed end of the bellows, a plate extending along one side of the bellows to prevent the contraction or expansion of the bellows at this side and having properties of slight flexure in a direction substantially perpendicular to the direction of expansion or contraction of the bellows in accordance with the expansion or contraction of the bellows at the side opposite to the free side, a pivot pin mounted on the plate at the movable end of the bellows, a responsive member disposed on the pin for pivotal movement relative to the plate and extending across the movable end of the bellows in abutting relationship to the bellows for pivotal movement in accordance with the expansion or contraction of the bellows and having portions extending beyond the movable end of the bellows and toward the fixed end of the bellows, a spring adjustably anchored at one end and connected to the responsive member at the other end to act upon the responsive member in a direction for maintaining the responsive member against the movable end of the bellows, and a counterbalance carried by the responsive member at the other end of the member for cooperating with the spring in maintaining the responsive member in dynamic equilibrium at the different pivotal positions of the responsive member.

References Cited in the file of this patent

UNITED STATES PATENTS

| | | |
|---|---|---|
| 1,161,376 | Bristol | Nov. 23, 1915 |
| 2,034,909 | Kollsman | Mar. 24, 1936 |
| 2,224,024 | Smith | Dec. 3, 1940 |
| 2,399,129 | Malone | Apr. 23, 1946 |
| 2,580,407 | Clark | Jan. 1, 1952 |
| 2,593,169 | Moore | Apr. 15, 1952 |
| 2,744,489 | Gallant | May 8, 1956 |

FOREIGN PATENTS

| | | |
|---|---|---|
| 284,832 | Switzerland | Dec. 1, 1952 |
| 641,894 | France | May 1, 1928 |